Figure 1:
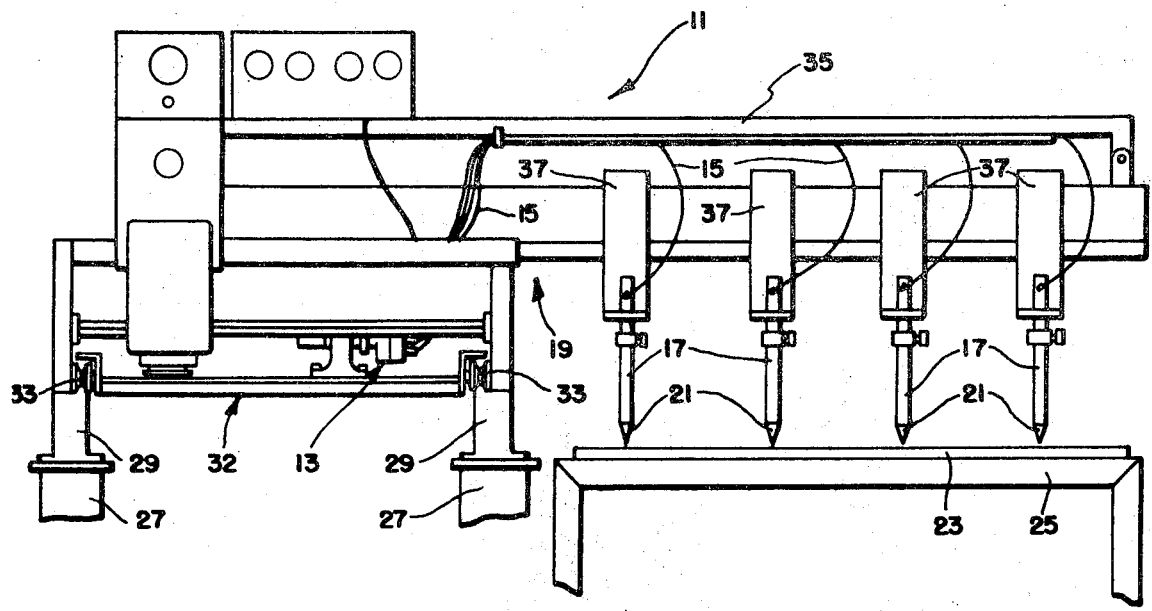

United States Patent

[11] 3,561,742

| [72] | Inventors | Ira C. Smith, deceased, late of Moorestown Township, N.J. by Elizabeth T. Smith, Moorestown, N.J. |
|---|---|---|
| [21] | Appl. No. | 749,262 |
| [22] | Filed | July 30, 1968 |
| [45] | Patented | Feb. 9, 1971 |
| [73] | Assignee | Liquid Carbonic Corporation Chicago, Ill. a corporation of Illinois. by mesne assignments |

[54] MULTIPLE GAS TORCH IGNITION AND SUPPORT SYSTEM
4 Claims, 2 Drawing Figs.

[52] U.S. Cl. .................................................... 266/23, 148/9
[51] Int. Cl. ...................................................... B23k 7/02
[50] Field of Search .......................................... 266/23(P), (H), (A); 148/9.5; 219/69(E), 121

[56] References Cited
UNITED STATES PATENTS

| 2,317,936 | 4/1943 | Nicholson et al. | 266/23 |
| 2,513,425 | 7/1950 | Lobosco | 266/23X |
| 2,935,312 | 5/1960 | Kilpatrick et al. | 266/23(R)UX |
| 3,246,115 | 4/1966 | Johnson | 266/23(A)UX |

*Primary Examiner*—Frank T. Yost
*Attorney*—Anderson, Luedeka, Fitch, Even & Tabin ABSTRACT: To ignite gas issuing from a plurality of flame cutting torches on a frame of a flame cutting machine, electrical spark discharges are caused from the tips of the torches to the metallic workpiece which is to be cut. Preferably, each torch is electrically insulated against being electrically grounded to the frame by an insulator which will fail if an excessive force is applied to its torch.

PATENTED FEB 9 1971 3,561,742

INVENTOR
IRA C. SMITH (DECEASED)

Anderson, Luedeka, Fitch, Even & Tabin
ATTYS.

3,561,742

MULTIPLE GAS TORCH IGNITION AND SUPPORT SYSTEM

This invention relates to a flame cutting apparatus and, more particularly, to an improved manner of igniting flame cutting torches.

One manner of igniting a plurality of torches of a flame cutting apparatus is disclosed in U.S. Pat. No. 3,065,382 in which each torch is provided with a wire firing electrode which extends down along the side of the torch and is fastened to the torch by a bracket. This wire electrode is connected by a suitable electrical conductor to a magneto. The end of each wire electrode is spaced from the torch by a suitable distance or gap across which a spark jumps to light the gas. While such a flame cutting apparatus has proven generally satisfactory, difficulty is encountered in igniting the torches after the wire electrodes become slagged or corroded from continued use, or when the wire electrode has been bumped and bent so that the desired width of gap is no longer present between the electrode and the torch. The failure of one or more of the torches to ignite automatically necessitates the institution of remedial measures which operators find aggravating and time consuming.

Accordingly, an object of the invention is to provide an improved, as contrasted with the prior art, manner of igniting flame cutting torches.

Figure 2:
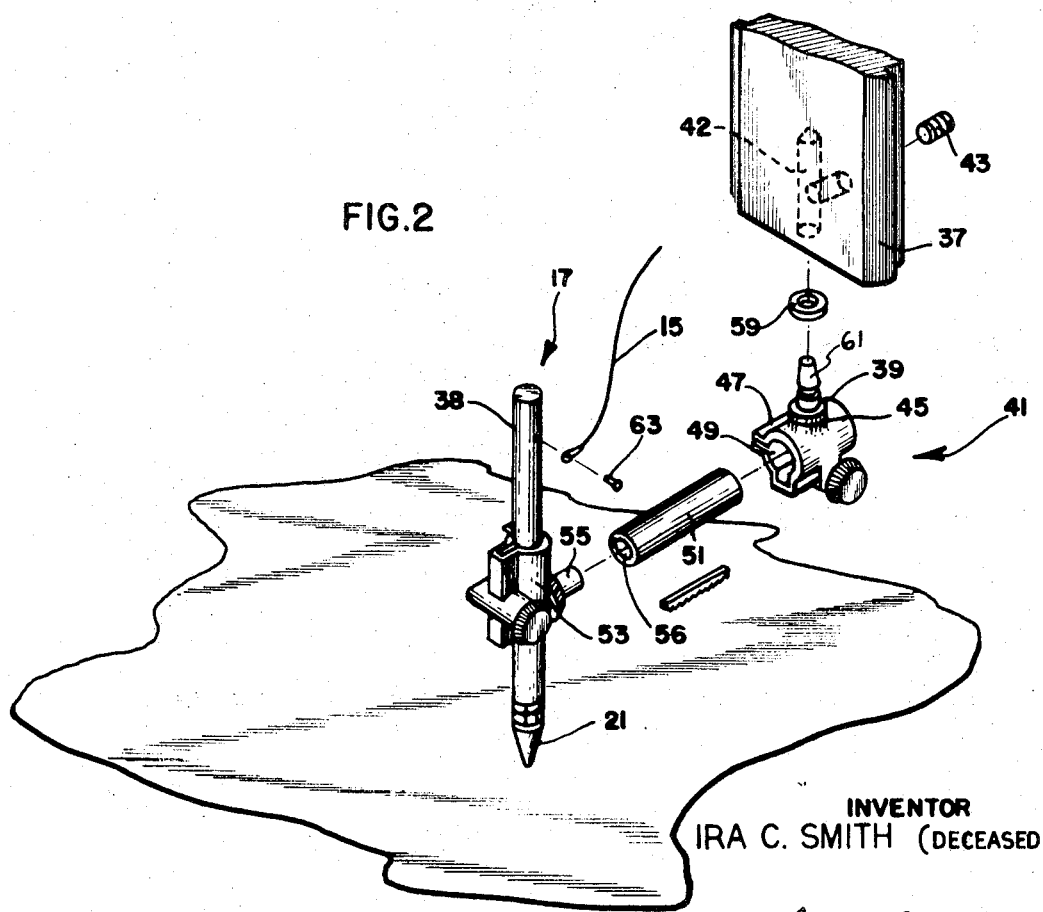

Other objects and advantages of the invention will become apparent from the detailed description taken in connection with the accompanying drawings in which:

FIG. 1 is a diagrammatic, elevational view of a flame cutting machine incorporating the invention; and FIG. 2 is an exploded, diagrammatic representation of a cutting torch mounted in accordance with the invention.

As shown in the drawings for purposes of illustration, the invention is embodied in a flame cutting machine or apparatus 11 which includes a suitable means for generating an electrical potential, such as a magneto 13, connected by conductors 15 to each of a plurality of gas fed, flame cutting torches 17 suitably supported on a frame 19 of the cutting apparatus with tips 21 of the torches adjacent a metallic workpiece 23 on a support or table 25. When the magneto 13 is operated it will produce voltage impulses which are sufficient to cause a spark to jump the gap between the tips 21 of the cutting torches 17 and the electrically grounded metal workpiece 23 on the work support 25 and ignite the gas that is flowing from the tip of each torch. By having the electrical discharge directly between the torches 17 and the workpiece 23, the separate wire electrodes (not shown) used in prior art torch ignition systems may be eliminated. After these wire electrodes were used for a period of time, the wire electrodes often became slagged, corroded, or bent, and failed to cause a spark and ignition of one or more torches. Also, thin wire electrodes tend to erode when subjected to extreme operating conditions and prolonged periods of high temperatures and hot gases. As will be explained in detail hereinafter, in the preferred method of ignition, the torch tips 21 ignite when the tips are at the proper clearance for actual cutting. Thus, ignition serves a height or distance sensing function to the operator and allows immediate cutting without further height adjustment.

Referring now in detail to the elements of the preferred embodiment of the invention, the flame cutting apparatus 11 will carry the torches 17 along a prescribed path, and, by suitable vertical adjusting movement, position the torches at the desired height above the workpiece 23. In this instance, the flame cutting apparatus 11 includes a stationary bed 27 with vertically disposed posts supporting a pair of parallel, spaced supporting rails 29 extending horizontally above a supporting foundation floor. The frame 19 also includes a traveling carriage 32 movable along said rails and having grooved rollers 33 for rolling along the rails 29. Projecting laterally from the carriage 32 is a generally horizontally disposed torch supporting beam 35 on which are carried the cutting torches 17. The torches are mounted in suitable means such as, for example, supporting brackets 37 which are fastened to the beam 35 at longitudinally spaced positions on the beam. To provide the requisite strength and rigidity for precision cutting, the bed 27, the beam 35 and the torch supporting brackets 37 are preferably made of metal.

The torches 17 may be of various constructions and may be like those previously provided with the separate and attached wire electrode of the prior art. The torches 17 include a central barrel 38 or body made of electrically conducting material which withstands heat, gases and continued use. The torch barrel includes a suitable bore connected to a gas fuel supply in a conventional manner which is not shown.

In accordance with an important aspect of the present invention, the torches 17 are electrically isolated, i.e., insulated, from the metal frame 19 in such a manner to assure that the electric current from the magneto 13 and torches does not flow to the frame 19 and thereby prevent the buildup of sufficient potential between the torches and the workpiece to cause an electrical discharge between the torches 17 and the workpiece 23. One manner of electrically insulating each torch 17 from the frame 19 is by means of an insulator which, in this instance, is in the form of a substantially cylindrical pin 39 (FIG. 2) of a suitable insulating material such as, for example, a ceramic or a plastic like polyethylene. The insulating pin 39, as will be explained, not only electrically isolates the torch 17, but also supports the torch. More specifically, the insulating pin 39 interconnects the bracket 37 and a torch holder 41 which carries the torch 17. The insulating pin 39 is disposed vertically with its upper end projecting into a vertical bore 42 in a lower end of the bracket 37 and is secured to the bracket by a suitable set screw 43 threaded into the bracket to engage and hold the pin 39 against downward sliding in the bore 42. The lower end of the insulating pin 39 is disposed in a bore in an upstanding boss 45 on a conventional split clamp 47 having a horizontally disposed bore 49 for receiving a hollow, cylindrical shaft 51 extending substantially horizontally and outwardly from the split clamp 47 to another clamp 53 which holds the torch 17 in a vertical position. A horizontal projection 55 on the torch holding clamp 53 projects into a bore 56 of the hollow shaft 51. To provide additional rigidity and strength and to further insulate the bracket 37 from the metallic split clamp 47, an insulating circular washer may be disposed on the insulating pin to space the lower end of the bracket 37 from the metallic split clamp 47. The thickness of the spacer 59 is designed to provide a greater electrical resistance to an electrical discharge between the metal bracket 37 and holder 41 than the air gap between the torch tips and workpiece 23. It will be appreciated that the torch may be electrically isolated by forming parts other than the pin 39 of an insulating material. For example, the tubular shaft 51 may be made of plastic or ceramic and electrically isolate the torch from the machine frame 19.

In accordance with another aspect of the invention, the insulating pin 39 is formed to have a predetermined strength so that it will break if its torch 17 hits an obstruction with sufficient impact. In this instance, the insulating pin 39 is formed with an annular groove 61 of a depth to provide a reduced cross-sectional neck which will fail before the thicker portion of the pin 39 will fail. Thus, the insulating pin 39 functions both as an insulator and as a shear pin.

The electric current for creating the electrical discharge between the torches 17 and the workpiece 23 is preferably provided by an electrical generating means, such as a magneto 13 carried on the carriage 32. Other electrical generating means such as transformers may be employed to generate sufficient potential to cause the electrical discharge. The magneto 13 may be of a conventional commercial make. Fastened to the output side of the magneto 13 are first ends of the electrical conductors 15 which are suitably supported on the beam 35 with the other ends of conductors extending to the metallic electrically conducting torch barrels 38 and fastened thereto by screws 63. Thus, each of the torches 17 is electrically connected to the magneto 13 so that an electric current may flow to the lower, conically shaped tip 21 of the torch. While the torch holder 41 is also able to conduct the electrical current, it is insulated from being electrically grounded to the frame 19 by the insulating pin 39.

The preferred method of operation of the invention will now be described. The torches 17 are disposed at a height considerably above the workpiece 23 and a switch (not shown) is operated to cause the magneto 13 to generate a high voltage electric current which is conducted over leads 15 to the torch barrels 38 and tips 21. As the tips 21 of the torches are lowered toward the workpiece, the potential builds up across the narrowing gap between the tips 21 and workpiece 23 until the gap is small enough to result in sufficient electric potential to create an electrical discharge across the gap in the form of a spark which ignites the gas issuing from the torches. The electric current supplied by the magneto is preferred to be set at the voltage and amperage which will result in gas ignition when the torch tips are at the proper cutting height above the workpiece. Thus, the ignition of the torches is a signal to the operator that the torches are at the proper clearance for actual cutting and the operator will terminate the lowering of the torches and need not immediately adjust the height of the torches from the workpiece. Thus, the present system may not only provide ignition but also provide for the proper clearance between the workpiece and torches so that flame cutting may being immediately at time of ignition.

Recapitulating, the preferred method of igniting the gas from the torches 25 includes the steps of positioning the tips 21 of torches closely adjacent the metallic workpiece 23, generating an electrical current and conducting the electric current to the workpiece adjacent to these tips while they are electrically insulated from being grounded by the machine, and causing an electrical, spark discharge from the torches to the workpiece whereby the gas issuing from the torches is ignited into flames.

From the foregoing, it will be seen that a cutting apparatus may be ignited by causing a spark between the torch and the workpiece when gas is flowing from the tip of the torch and that the prior art wire electrodes and the attendant problems therewith may be eliminated with the present invention. Also, there is provided a method of operation whereby the ignition of the torches indicates to the operator that the torches are at the proper clearance from the workpiece for actual cutting which can begin immediately. Damage to the flame cutting apparatus due to the torches hitting obstructions may be reduced by having an insulator supporting the torches and failing with a predetermined force.

While a preferred embodiment has been shown and described, it will be understood that there is no intent to limit the invention by such disclosure but, rather, it is intended to cover all modifications and alternate constructions falling within the spirit and scope of the invention as defined in the appended claims.

I claim:

1. In a flame cutting machine, a frame, a plurality of gas fed flame cutting torches mounted on said frame, means positioning said torches into locations with the tips thereof closely adjacent a metal workpiece to be cut, means operable to generate an electrical current and potential sufficient to cause a spark to ignite said torches, electrical conductor means connecting said potential generating means to said torches and conducting electrical current to said torches, and means isolating said torches electrically from said frame so that operation of said potential generating means and conduction of electrical current to said torches causes sparks to jump between said torches and the workpiece to ignite the gas for said torches.

2. A flame cutting machine in accordance with claim 1 in which said isolating means supports said torches on said frame and has a predetermined strength to break when excessive force is applied to said torches.

3. A flame cutting machine in accordance with claim 2 in which said isolating means is a shear pin.

4. In a flame cutting machine, a frame, a plurality of flame cutting torches mounted on said frame, each of said cutting torches including an electrically conducting, metallic torch body terminating at a tip from which will issue gas for ignition into a flame, means for positioning said torches with the tips thereof closely adjacent metal workpiece to be cut, means on said frame for generating an electric current for creating sparks to ignite said torches, electrical conductors extending from said electrical generating means to said metallic torch body for conducting current thereto, electrical insulator means on said frame mounting said torches on said frame and electrically insulating said torches from being electrically grounded by said frame so that electrical current flowing to said metallic torch bodies will cause electrical discharges between said closely adjacent metal workpiece and the torches and ignition of the gas into flames.